US012482618B2

(12) United States Patent
Dhotre et al.

(10) Patent No.: US 12,482,618 B2
(45) Date of Patent: Nov. 25, 2025

(54) ELECTRICAL SWITCHING DEVICE

(71) Applicant: HITACHI ENERGY LTD, Zürich (CH)

(72) Inventors: Mahesh Dhotre, Brugg (CH); Jakub Korbel, Baden (CH); Matteo Papetti, Milan (IT); Christoph Wirth, Pfungen (CH); Rijo-Jude Raphael, Zürich (CH); Robert Voss, Zurich (CH)

(73) Assignee: HITACHI ENERGY LTD, Zürich (CH)

( * ) Notice: Subject to any disclaimer, the term of this patent is extended or adjusted under 35 U.S.C. 154(b) by 211 days.

(21) Appl. No.: 18/038,762

(22) PCT Filed: Dec. 3, 2021

(86) PCT No.: PCT/EP2021/084113
§ 371 (c)(1),
(2) Date: May 25, 2023

(87) PCT Pub. No.: WO2022/117788
PCT Pub. Date: Jun. 9, 2022

(65) Prior Publication Data
US 2023/0420203 A1    Dec. 28, 2023

(30) Foreign Application Priority Data
Dec. 4, 2020 (EP) .................................. 20211766

(51) Int. Cl.
*H01H 33/91* (2006.01)
*H01H 3/12* (2006.01)
(Continued)

(52) U.S. Cl.
CPC ............ *H01H 33/91* (2013.01); *H01H 33/12* (2013.01); *H01H 33/22* (2013.01)

(58) Field of Classification Search
CPC ...... H01H 33/91; H01H 33/12; H01H 33/121; H01H 33/122; H01H 33/22; H01H 33/905;
(Continued)

(56) References Cited

U.S. PATENT DOCUMENTS 5,534,673 A * 7/1996 Lehmann ............... H01H 33/53
218/78
8,389,886 B2 * 3/2013 Dahlquist .............. H01H 33/74
218/59
(Continued)

FOREIGN PATENT DOCUMENTS

EP    0087578 A1    9/1983
EP    1548780 A1    6/2005
(Continued)

OTHER PUBLICATIONS

Translation of EP 1548780 (Original document published Jun. 29, 2005) (Year: 2005).*
(Continued)

*Primary Examiner* — William A Bolton
(74) *Attorney, Agent, or Firm* — Sage Patent Group

(57) ABSTRACT

The invention relates to an electrical switching device including a nominal contact arrangement, an arcing contact arrangement defining an arcing volume in which an arc-quenching medium is present, an exhaust system including a first exhaust opening connected fluidly to a tank volume, an exhaust channel for dissipating hot medium from the arcing volume into the tank volume, the exhaust system further including a piston arranged in a compression guide and defining on its side opposed to the arcing volume together with the compression guide a compression chamber. An inlet channel is fluidly connected to the compression chamber and extends to an inlet opening fluidly connected to (Continued)

the tank volume, wherein the inlet channel and the exhaust channel are fluidly separated from each other.

20 Claims, 2 Drawing Sheets

(51) Int. Cl.
*H01H 33/12* (2006.01)
*H01H 33/22* (2006.01)

(58) Field of Classification Search
CPC ....... H01H 2033/566; H01H 2033/908; H01H 33/903; H01H 2033/907; H01H 2033/906
USPC ....... 218/154, 57, 59, 60, 61, 63, 68, 69, 72
See application file for complete search history.

(56) References Cited

U.S. PATENT DOCUMENTS

| | | | |
|---|---|---|---|
| 8,530,774 B2 | 9/2013 | Grieshaber et al. | |
| 8,779,316 B2* | 7/2014 | Drews | H01H 33/74 218/51 |
| 8,822,868 B2* | 9/2014 | Kehr | H01H 33/86 218/66 |
| 9,524,836 B2* | 12/2016 | Ozil | H01H 33/901 |
| 9,627,155 B2* | 4/2017 | Heiermeier | H01H 3/00 |
| 9,899,167 B2* | 2/2018 | Florez | H01H 33/7015 |
| 10,157,719 B2 | 12/2018 | Nakai et al. | |
| 10,685,798 B2* | 6/2020 | Cernat | H01H 33/703 |
| 2005/0150868 A1* | 7/2005 | Nowakowski | H01H 33/7015 218/57 |
| 2007/0241079 A1 | 10/2007 | Johnson et al. | |
| 2011/0163069 A1* | 7/2011 | Ohlsson | H01H 33/901 218/66 |
| 2013/0169357 A1 | 7/2013 | Yaginuma et al. | |
| 2015/0021297 A1* | 1/2015 | Stoller | H01H 33/7015 218/51 |

FOREIGN PATENT DOCUMENTS

| | | |
|---|---|---|
| EP | 3087578 A1 | 11/2016 |
| EP | 3200214 A1 | 8/2017 |
| JP | 01313827 A | 12/1989 |
| JP | S6182631 B2 | 11/1995 |
| WO | 2013151741 A1 | 10/2013 |
| WO | 2015040069 A1 | 3/2015 |

OTHER PUBLICATIONS

Notice of Reasons for Refusal, Japanese Patent Application No. 2023-534006, mailed May 13, 2024, 8 pages.

Examination Report for Indian Patent Application No. 202347037201, mailed Jan. 12, 2024, 5 pages.

International Search Report and Written Opinion of the International Searching Authority, PCT/EP2021/084113, mailed Mar. 25, 2022, 12 pages.

International Preliminary Report on Patentability, PCT/EP2021/084113, mailed Nov. 2, 2022, 6 pages.

* cited by examiner

ELECTRICAL SWITCHING DEVICE

CROSS REFERENCE TO RELATED APPLICATIONS

This application is a 35 U.S.C. § 371 national stage application of PCT International Application No. PCT/EP2021/084113 filed on Dec. 3, 2021, which in turn claims priority to European Application No. 20211766.9, filed on Dec. 4, 2020, the disclosures and content of which are incorporated by reference herein in their entirety.

FIELD

The disclosure is in the field of medium and high voltage switching technologies and relates to an electrical switching device according to the independent claim, particularly for a use as an earthing device, a fast-acting earthing device, a circuit breaker, a generator circuit breaker, a switch disconnector, a combined disconnector and earthing switch, or a load break switch in power transmission and distribution systems.

BACKGROUND

Electrical switching devices are well known in the field of medium and high voltage switching applications. They are e.g. used for interrupting a current when an electrical fault occurs. As an example for an electrical switching device, circuit breakers have the task of opening contacts and keeping them far apart from one another in order to avoid a current flow. The electrical switching devices, like said circuit breakers, may be rated to carry high nominal currents of 2000 A to 6300 A and to switch very high short circuit currents of 10 kA to 100 kA at very high voltages of 110 kV to 1200 kV.

SUMMARY

According to some embodiments, an electrical switching device is disclosed having a longitudinal axis and delimiting a tank volume, comprising a nominal contact arrangement with a first nominal contact and a mating second nominal contact, which are movable, parallel to the longitudinal axis, in relation to each other and cooperate with each other to switch between a closed state and an open state of the switching device, an arcing contact arrangement with a first arcing contact associated with the first nominal contact and a mating second arcing contact associated with the second nominal contact, which are movable, parallel to the longitudinal axis, in relation to each other and cooperate with each other to switch between the closed state and the open state, the first arcing contact and the second arcing contact defining an arcing volume in which an arc is generated during a switch between the closed state and the open state and in which an arc-quenching medium is present, an exhaust system surrounding the arcing volume and comprising a first exhaust opening connected fluidly to the tank volume, an exhaust channel extending from the arcing volume to the first exhaust opening, the exhaust channel being designed for dissipating hot arc-quenching medium from the arcing volume through the first exhaust opening into the tank volume, the exhaust system further comprising a compression guide extending along the longitudinal axis, a piston arranged slideably in the compression guide, the piston delimiting on its side facing the arcing volume together with the compression guide a heating chamber fluidly connected to the arcing volume, the piston defining on its side opposed to the arcing volume together with the compression guide a compression chamber fluidly connected to the tank volume, and an inlet channel is fluidly connected to the compression chamber and extends to an inlet opening fluidly connected to the tank volume, wherein the inlet channel and the exhaust channel are fluidly separated from each other, characterized in that the inlet channel is oriented in a downward direction in a usage position of the electrical switching device, and in that, as viewed along the longitudinal axis in the direction opposed to the arcing region, the inlet opening is arranged after the first exhaust opening.

BRIEF DESCRIPTION OF THE DRAWINGS

Embodiments, advantages, and applications of the disclosure result from the dependent claims, from claim combinations and from the now following description and figures. It is shown in:

DETAILED DESCRIPTION

Figure 1:
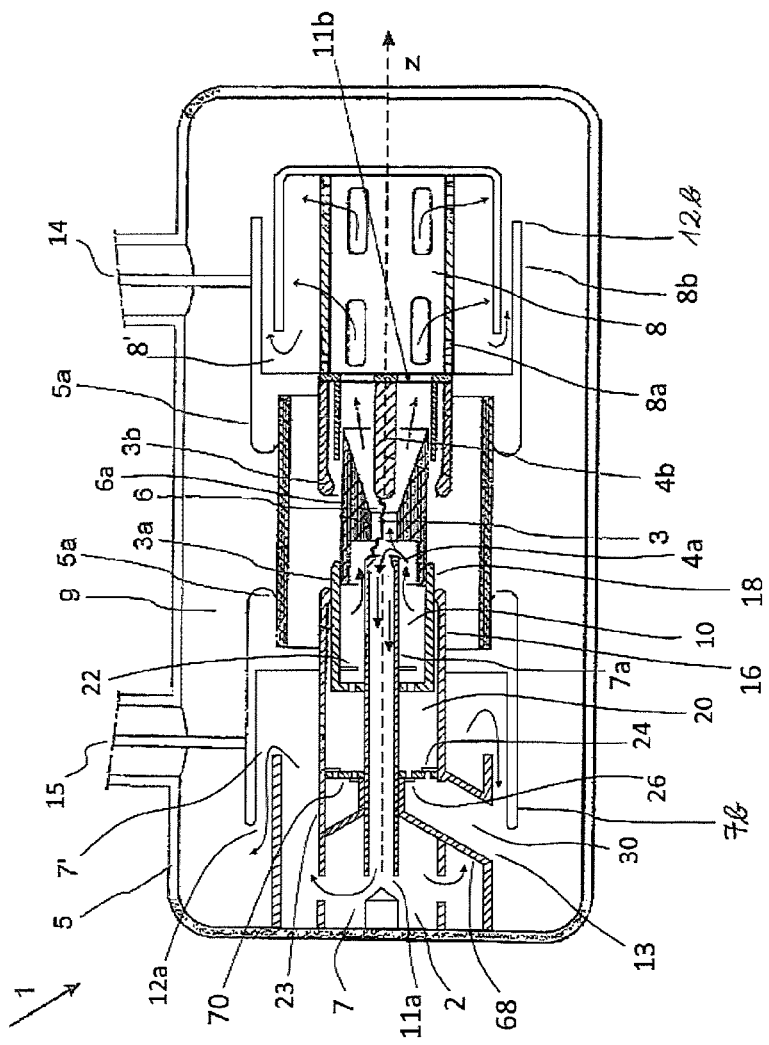
FIG. 1, schematically, a sectional view of a high voltage circuit breaker embodiment according to the disclosure.

For the purposes of this disclosure the term medium voltage refers to voltages from 1 kV to 72.5 kV and the term high voltage refers to voltages higher than 72.5 kV.

When disconnecting (opening) nominal contacts of the electrical switching device, the current flowing through the electrical switching device commutates from the nominal contacts to its arcing contacts. As well, when connecting (closing) the nominal contacts, the arcing contacts are connected in advance. In embodiments the arcing contacts comprise, as a first arcing contact, arcing contact fingers arranged around the longitudinal axis of the electrical switching device in a so-called arcing finger cage and, as a second arcing contact, a rod or pin which is driven into the finger cage.

During the opening process of the electrical switching device an electric arc forms between the first and the second arcing contact, an area being called arcing volume, which arc is conductive and still carries electric current even after the opening or physical separation of the arcing contacts. To interrupt the current, the electrical switching devices contain a dielectrically inert fluid used as a dielectric insulating medium and for quenching the electric arc as fast as possible.

Quenching the electric arc means extracting as much energy as possible from it. Consequently, a part of the fluid located in the area where the electric arc is generated is considerably heated up (to around 20'000° C. to 30'000° C.) in a very short time. Because of its volume expansion this part of the fluid builds up a pressure and is ejected from the arcing volume. In this way the electric arc is blown off around the instant when the current is zero. The fluid flows into one or more exhaust volumes where it is cooled and redirected by a cooling device.

During the closing process of the electrical switching device, the first arcing contact is moved towards the second arcing contacts to be connected to each other, resulting in an under pressure in a compression volume located behind the first arcing contact. To compensate this under pressure, fluid from the exhaust system or from the tank is sucked in into the compression volume by way of a refill valve that opens. From this compression volume, the fluid flows at a later stage into the arcing volume.

Usually, the fluid from the exhaust volume, i.e. the exhaust gas, is not clean and contains arcing dust as well as generated particles which later find their way into the compression volume. It remains in the compression volume and at a later stage after current zero, when an intermediate valve between the compression volume and a heating volume opens. The heating volume is fluidly connected to the arcing volume and consequently the potentially polluted fluid is directed into the arcing volume. This may trigger flashovers or late restrikes which have a negative impact on the dielectric strength in the arcing volume.

In a particular embodiment of electrical switching devices like a metal enclosed high voltage circuit breaker (HVCB), the HVCB may successfully carry out O-0.3s-CO operation under varying levels of the short circuit current stresses for test duty. During the close operation, under pressure is created in the compression volume which sucks in the arc-quenching medium from the exhaust system into the compression volume and late restrike might be observed.

It is an objective of the present disclosure to provide an improved design to have fresh arc-quenching medium available for refilling the compression volume in an electrical switching device.

This objective is achieved by the subject-matter of the independent claims. Embodiments are disclosed in the dependent claims, any claim combinations thereof, and in the description together with the figures.

Switching device means electrical switching device and can encompass, for example, a high-voltage circuit breaker, a generator circuit breaker, a disconnector, a combined disconnector and earthing switch, a load break switch, an earthing device, or a fast-acting earthing device.

It is disclosed an electrical switching device having a longitudinal axis and delimiting a tank volume. The electrical switching device comprises a nominal contact arrangement with a first nominal contact and a mating second nominal contact, optionally centered on the longitudinal axis, which are movable parallel to the longitudinal axis, in relation to each other and cooperate with each other to switch between a closed state and an open state of the switching device.

The electrical switching device also comprises an arcing contact arrangement with a first arcing contact associated with the first nominal contact and a mating second arcing contact associated with the second nominal contact, optionally centered on the longitudinal axis, which are movable parallel to the longitudinal axis, in relation to each other and cooperate with each other to switch between the closed state and the open state.

The first arcing contact and the second arcing contact define an arcing volume in which an arc is generated during a switch between the closed state and the open state and in which an arc-quenching medium is present. The arc-quenching medium is a dielectrically inert fluid used as a dielectric insulating medium and for quenching the electric arc as fast as possible.

Further, the electrical switching device comprises an exhaust system surrounding the arcing volume and separating the arcing volume from the tank volume. The exhaust system comprises an exhaust channel designed to connect fluidly the arcing volume to the tank volume and for dissipating hot arc-quenching medium from the arcing volume into the tank volume. This hot arc-quenching medium is also referred to as exhaust gas in the present disclosure.

The exhaust channel comprises an arcing end opening into the arcing volume and a first exhaust opening which is opening out into the tank volume. The first exhaust opening is defined as the interface between the exhaust system and the tank volume and represents the transition surface through which the exhaust gas is transferred from the exhaust system to the tank volume.

The exhaust channel can comprise multiple elements fluidly connected to each other, directly or by way of one or more intermediary volumes, usually conceived to optimize the exhaust gas flow and exhaust gas cooling. The exhaust channel can comprise a first channel element that can be in the form of an exhaust tube, optionally centered on the longitudinal axis, and fluidly connected to the arcing volume at the arcing end opening and to a first exhaust volume on an exhaust side of the exhaust tube, the first exhaust volume being connected and opening into the tank volume at the first exhaust opening.

The exhaust system further comprises a compression guide extending longitudinally, and a piston arranged slideably in the compression guide, optionally in a gas-tight manner. The piston can be formed at least partially by the first nominal contact. The piston is open on its side facing the arcing volume and delimits together with the compression guide on its side facing the arcing volume a heating chamber fluidly connected to the arcing volume. The volume in the compression guide between the piston and the compression guide defines a compression chamber. The compression chamber is designed to be compressed in a compression phase by a relative movement of the first arcing contact and the second arcing contact from the closed state to the open state, when the piston and the first nominal contact are moved in the direction opposed to the arcing region. Further, the compression chamber is designed to be expanded in an expansion phase by a relative movement of the first arcing contact and the second arcing contact from the open state to the closed state, when the piston and the first nominal contact are moved in the direction of the arcing region.

The first nominal contact and the first arcing contact are electrically connected to a first current conductor. The second nominal contact and the second arcing contact are electrically connected to a second current conductor.

In embodiments, the first nominal contact and the first arcing contact are movable along the longitudinal axis and the second nominal contact and the second arcing contact are stationary. In this case, the first nominal contact and the first arcing contact are connected to the first current conductor that is a moving-side current conductor. The second nominal contact and the second arcing contact are electrically connected to the second current conductor that is a stationary-side current conductor.

In other embodiments, the first nominal contact and the first arcing contact are stationary, and the second nominal contact and the second arcing contact are movable along the longitudinal axis.

As viewed along the longitudinal axis, the first exhaust opening is arranged on the side of the arcing volume comprising the compression chamber. The exhaust system can further comprise a second exhaust opening arranged on the side of the arcing volume opposed to the compression chamber. The first exhaust opening can be formed axisymmetrically with respect to the longitudinal axis and extend over the circumference of the exhaust system, forming a continuous slit in the exhaust system. A similar arrangement is also possible for the second exhaust opening.

The compression chamber is fluidly connected to the tank volume by a fluidic connection designed to allow the passage of arc-quenching medium from the tank volume to the compression chamber during the expansion phase and the passage of arc-quenching medium from the compression chamber to the tank volume during the compression phase.

An inlet channel is fluidly connected to the compression chamber and extends to an inlet opening fluidly connected to the tank volume, wherein the inlet channel and the exhaust channel are fluidly separated from each other. In the expansion phase, the arc-quenching medium sucked in through the inlet opening can be refilled from the tank volume to the compression volume. The separation of the inlet channel and the exhaust channel consequently prevents the compression volume from a refill with arc-quenching medium coming from the exhaust system and containing arcing dust. As a result, clean and cold arc-quenching medium refilled in the compression volume enters the arcing volume at a later stage. In turn, this reduces the possibility of late restrikes and helps in increasing the dielectric strength due to the cleaner arc-quenching medium reaching the arcing volume.

During the compression phase, arc-quenching medium is released from the compression volume directly into the volume tank instead of being mixed with in the exhaust system with the exhaust gas.

The separation of the inlet channel and the exhaust channel is to be understood such that, with the exception of leakage between assembled part of the electrical switching device, arc-quenching medium in the exhaust channel or flowing through the exhaust channel can possibly reach the inlet channel only when it first flows through the volume tank.

Clean arc-quenching medium is to be understood as arc-quenching medium from the tank volume as opposed to arc-quenching medium present in the exhaust system, in other words exhaust gas, containing arcing dust. Exhaust gas reaches the tank volume at one point after separation of the arcing contacts. However arcing dust segregate from the exhaust gas in the tank volume and accumulate in a wall region of the tank volume. As a result, arc-quenching medium in the tank volume progressively contains less arcing dust with time.

According to the disclosure, the inlet channel is oriented in a downward direction in a usage position of the electrical switching device. This arrangement reduces the quantity of arcing dust that can enter and accumulate at an interior wall of the inlet channel. The interior wall of the inlet channel is defined as the wall that is in contact with the arc-quenching medium flowing between the compression chamber and the tank volume. Consequently, this arrangement further reduces the quantity of arcing dust that can enter in the compression chamber at a later stage. This further reduces the possibility of late restrikes and helps in increasing the dielectric strength due to the cleaner arc-quenching medium reaching the arcing volume.

The usage position of the electrical switching device corresponds to its mounted position for use at a site. In the case in which the usage position corresponds to a longitudinal axis extending in a horizontal direction, downwards is to be understood as extending in the direction of gravity. In the usage position, the first conductor that can be the moving-side current conductor and the second conductor that can be the stationary-side current conductor are arranged on the side of the electrical switching device opposed to the direction of gravity.

Further according to the disclosure, the inlet opening is arranged after the first exhaust opening, as viewed along the longitudinal axis (z) in the direction opposed to the arcing region. This arrangement reduces the exhaust gas flowing from the exhaust system into the inlet channel in a region where the inlet opening adjoins the first exhaust opening. In this region, exhaust gas can flow into the tank volume and subsequently through the adjacent inlet opening into the inlet channel Optionally, the inlet opening, and the first exhaust opening are free from an overlapping region to reduce the interaction described above to the minimum.

In an example embodiment, the inlet channel is fluidly connected directly to the compression chamber and can extend from the compression chamber to the inlet opening. In embodiments, the inlet channel can be fluidly connected to a connection chamber and, from the connection chamber, extend to the inlet opening, the connection chamber being fluidly connected to the compression chamber. This later arrangement has the advantage that the interface geometry between the compression chamber and the connection chamber can be designed independently from the geometry of the inlet channel, providing more flexibility in the design of the electrical switching device.

In an example embodiment, the inlet channel can be formed as a hollow spoke to keep the design simple.

In an example embodiment, the inlet channel extends inclined with respect to the longitudinal axis, radially outwards as viewed in the direction opposed to the arcing region. In other words, an inlet channel axis of the inlet channel extends with increasing distance from the longitudinal axis, as viewed in the direction of arc-quenching medium flowing out of the compression chamber in the compression phase. This embodiment has the advantage that fresh cold arc-quenching medium is guided in the inlet channel in an improved manner.

The term "inclined" in the present disclosure also includes the orientation "perpendicular to the longitudinal axis".

For this purpose, the inclination angle of the inlet channel axis with respect to the longitudinal axis can range from 5° to 85°, optionally from 30° to 60° or approximately 45°. These ranges lead to an efficient guiding of fresh cold arc-quenching medium, whereas improved results have been found for an angle in the range from 30° to 60° with an optimum around 45°.

It is also possible to conceive an embodiment in which the inlet channel is oriented in an upward direction in a usage position of the electrical switching device. Since arcing dust segregates and accumulates at a lower inner wall, i.e. a bottom, of tank volume under the effect of gravity, the upward orientation of the inlet channel has the advantage to further increase the distance from the inlet opening to accumulated arcing dust.

Choosing between the upward or the downward direction for the inlet channel can depend on the conformation of the tank volume and of the exhaust system, which have an influence on accumulation sites of arcing dust. For the same reason, it is also possible to conceive embodiments in which inlet channels are oriented downwards and further inlet channels are oriented upwards.

In an example embodiment, a plurality of inlet channels having each an inlet opening forming together a plurality of inlet openings can be provided to increase the quantity of arc-quenching medium flowing between the tank volume and the compression chamber without increasing the size of the respective inlet openings. Consequently, more arc-quenching medium can flow but the quantity of arcing dust sucked in is not significantly increased. Optionally the inlet openings are formed as hollow spokes for a simple design.

In an example embodiment, the plurality of inlet channels and the corresponding plurality of inlet openings are distributed circumferentially in an axisymmetric manner with respect to the longitudinal axis. This arrangement leads to an efficient guiding of fresh cold arc-quenching medium.

However, it is also possible to arrange the plurality of inlet channels in a non-symmetric manner, for example when the conformation of the exhaust system does not allow a symmetrical arrangement.

In an example embodiment, the plurality of inlet channels and the corresponding plurality of inlet openings are distributed circumferentially with respect to the longitudinal axis, symmetrically with respect to a longitudinal symmetry plane. This arrangement allows for a simple design.

In an example embodiment, the plurality of inlet openings are oriented in a downward direction in the usage position of the electrical switching device. The advantages of this arrangement have already been discussed in detail above. This orientation reduces the quantity of arcing dust that can enter and accumulate at the interior wall of the inlet channel. This reduces the possibility of late restrikes and helps in increasing the dielectric strength due to the cleaner arc-quenching medium reaching the arcing volume.

In an example embodiment, Consequently, the same number of inlet channels are arranged on both side of the central inlet channel. This configuration allows for a simple design, which advantages have been discussed above.

In an example embodiment, the longitudinal symmetry plane can be oriented vertically. In this arrangement, arcing dust is segregated in a homogenous manner on both side of the longitudinal symmetry plane under the effect of gravity. In addition, in embodiments in which the longitudinal symmetry plane extends through the central inlet channel of the plurality of inlet channels, the central channel and its corresponding inlet opening are arranged in the lowest position with respect to the plurality of inlet channels and inlet openings. Therefore, arcing dust entering therethrough is minimized.

In an example embodiment, the plurality of channel openings are distributed circumferentially with respect to the longitudinal axis, within a circular sector having a central angle $\alpha$ ranging from 5° to 180° measured in a plane perpendicular to the longitudinal axis. The circular sector defines an angular opening in which the plurality of channel openings are distributed circumferentially. These angular sectors minimize arcing dust entering in the inlet channels. For an example angle $\alpha$ ranging from 60° to 120°, a further reduction of arcing dust entering in the inlet channels can be shown, while still presenting the desired mechanical stability in the vicinity of the inlet channels. The range to 90° for the angle $\alpha$ is more preferred to further optimize this aspect.

In embodiments having a longitudinal symmetry plane, the circular sector extends consequently equally on both side of the longitudinal symmetry plane. In this case, an angular sector of 60° means that the plurality of channel openings is distributed circumferentially over 30° on each side of the longitudinal symmetry plane.

In an example embodiment, the plurality of channel openings can be distributed circumferentially and at least one of the channel openings is offset axially with respect to the others. This configuration allows the arrangement of channel openings in a narrow circular sector of 60° to 30° without reducing the circumferential distance between consecutive inlet openings such that the structure supporting the inlet openings is not weakened and the mechanical stability is improved.

In an example embodiment, the inlet openings and the plurality of inlet openings, respectively, is fluidly connected to a refill valve designed to allow the passage of arc-quenching medium from the tank volume to the compression chamber and an overpressure valve designed to allow the passage of arc-quenching medium from the compression chamber to the tank volume.

In an example embodiment, the electrical switching device comprises a channeling element adjoining the compression chamber on the side facing away to the arcing volume, and in which the inlet openings and the plurality of inlet openings, respectively, is formed.

In an example embodiment, the channeling element is formed as a hollow conduit, optionally cylindrically formed, delimiting a connecting chamber having a lateral wall. The connecting chamber is designed to be connected fluidly to the compression chamber at a conduit end. The opposed end is closed in a gas-tight manner to be free from fluid communication from the exhaust system. The lateral wall has a plurality of windows from which each time one inlet channel extends radially outwards, forming a plurality of inlet channels. Each inlet channel extends through the lateral wall to the corresponding inlet opening, forming a plurality of inlet openings. It is also possible to design the inlet channels such that they extend outwards in a downward direction in the usage position of the electrical switching device. The provision of a channeling element has the advantage that the design of the electrical switching device can be easily adapted to different exhaust configuration by adjusting only the geometry of the channeling element.

In an example embodiment, the arc-quenching medium is a dielectric insulating medium comprising $SF_6$ and/or $CO_2$ and/or an organofluorine compound selected from the group consisting of: a fluoroether, an oxirane, a fluoroamine, a fluoroketone, a fluoroolefine, a fluoronitrile, and mixtures and/or decomposition products thereof.

For the purposes of this disclosure the arc-quenching medium used in the electrical switching device can be $SF_6$ gas or any other dielectric insulation medium, may it be gaseous and/or liquid, and in particular can be a dielectric insulation gas or arc quenching gas. Such dielectric insulation medium can for example encompass media comprising an organofluorine compound, such organofluorine compound being selected from the group consisting of: a fluoroether, an oxirane, a fluoroamine, a fluoroketone, a fluoroolefin and mixtures and/or decomposition products thereof. Herein, the terms "fluoroether", "oxirane", "fluoroamine", "fluoroketone" and "fluoroolefin" refer to at least partially fluorinated compounds. In particular, the term "fluoroether" encompasses both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, and the term "fluoroolefin" encompasses both hydrofluoroolefins and perfluoroolefins. It can thereby be preferred that the fluoroether, the oxirane, the fluoroamine and the fluoroketone are fully fluorinated, i.e. perfluorinated.

In high or medium voltage switching devices, there is a decomposition of the arc-quenching medium when heated up above certain levels, which may be encountered under certain operating conditions. This decomposition is undesired, as it reduces the insulating properties of the arc-quenching medium. $SF_6$ has the property that it recombines when it is cooled down and thereby regains substantially its full dielectric properties impacting positively the performance of the electrical switching device.

In embodiments, the arc-quenching medium is selected from the group consisting of: a (or several) hydrofluoroether(s), a (or several) perfluoroketone(s), a (or several) hydrofluoroolefin(s), and mixtures thereof.

In particular, the term "fluoroketone" as used in the context of the present disclosure shall be interpreted broadly and shall encompass both fluoromonoketones and fluorodiketones or generally fluoropolyketones. Explicity, more than a single carbonyl group flanked by carbon atoms may be present in the molecule. The term shall also encompass both saturated compounds and unsaturated compounds including double and/or triple bonds between carbon atoms. The at least partially fluorinated alkyl chain of the fluoroketones can be linear or branched and can optionally form a ring.

In embodiments, the arc-quenching medium comprises at least one compound being a fluoromonoketone and/or comprising also heteroatoms incorporated into the carbon backbone of the molecules, such as at least one of: a nitrogen atom, oxygen atom and sulphur atom, replacing one or more carbon atoms. Optionally, the fluoromonoketone, in particular perfluoroketone, can have from 3 to 15 or from 4 to 12 carbon atoms and particularly from 5 to 9 carbon atoms. Optionally, it may comprise exactly 5 carbon atoms and/or exactly 6 carbon atoms and/or exactly 7 carbon atoms and/or exactly 8 carbon atoms.

In embodiments, the arc-quenching medium comprises at least one compound being a fluoroolefin selected from the group consisting of: hydrofluoroolefins (HFO) comprising at least three carbon atoms, hydrofluoroolefins (HFO) comprising exactly three carbon atoms, trans-1,3,3,3-tetrafluoro-1-propene (HFO-1234ze), 2,3,3,3-tetrafluoro-1-propene (HFO-1234ye, and mixtures thereof.

The dielectric insulation medium can further comprise a background gas or carrier gas different from the organofluorine compound (in particular different from the fluoroether, the oxirane, the fluoroamine, the fluoroketone and the fluoroolefin) and can in embodiments be selected from the group consisting of: air, $N_2$, $O_2$, $CO_2$, a noble gas, $H_2$; $NO_2$, $NO$, $N_2$, $O$; fluorocarbons and in particular perfluorocarbons, such as $CF_4$; $CF_3I$, $SF_6$; and mixtures thereof.

In an example embodiment, the organofluorine compound is selected from the group consisting of: perfluoroether, hydrofluoroether, perfluoroamine, perfluoroketone, perfluoroolefin, hydrofluoroolefine, perfluoronitrile, and mixtures thereof; in particular in mixtures with a background gas and more particularly in a mixture with a background gas compound selected from the group consisting of: air, air components, nitrogen, oxygen, carbon dioxide, nitrogen oxides.

In an example embodiment, the organofluorine compound is a fluoroketone having from 4 to 15 carbon atoms, in particular the fluoroketone being selected from the group consisting of: fluorketones having exactly 5 carbon atoms, fluorketones having exactly 6 carbon atoms, fluorketones having exactly 7 carbon atoms, fluorketones having exactly 8 carbon atoms, such fluoroketones with at least one of the mentioned carbon atoms being replaced by a heteroatom, in particular being replaced by nitrogen and/or oxygen and/or sulphur, and mixtures thereof; and/or characterized in that the fluoronitrile is a perfluoronitrile containing two carbon atoms, three carbon atoms or four carbon atoms, in particular is a perfluoroalkylnitrile, specifically perfluoroacetonitrile, perfluoropropionitrile ($C_2F_5CN$) and/or perfluorobutyronitrile ($C_3F_7CN$) and more particularly is perfluoroisobutyronitrile according to the formula $(CF_3)_2$CFCN and/or perfluoro-2-methoxypropanenitrile according to the formula $CF_3CF(OCF_3)CN$.

In embodiments, the fluoronitrile is in a mixture with an organofluorine compound selected from the group consisting of: a fluoroether, an oxirane, a fluoroamine, a fluoroketone, a fluoroolefine, and mixtures and/or decomposition products thereof; in particular the fluoronitrile being in mixtures with a background gas and more particularly in a mixture with a background gas compound selected from the group consisting of: air, air components, nitrogen, oxygen, carbon dioxide, nitrogen oxides.

Sulphur hexafluoride ($SF_6$) is a well-established insulation gas due to its outstanding dielectric properties and its chemical inertness. Despite these properties, efforts to look for an alternative insulation gas have nevertheless been intensified, in particular in view of a substitute having a lower Global Warming Potential (GWP) than the one of $SF_6$.

FIG. 1 shows a sectional view of an embodiment of a high voltage circuit breaker 1 in an opened configuration. The high voltage circuit breaker 1 represented is an exemplary embodiment of the electrical switching device according to the disclosure. The elements of the circuit breaker which are related to the present disclosure will be described but a detailed description of the operating principles of the circuit breaker 1 is not given.

The electrical switching device 1 can be essentially rotationally symmetric about a longitudinal axis z. The purely exemplary high voltage circuit breaker 1 is enclosed by an external enclosure 5 which normally is cylindrical, arranged around a longitudinal axis z and delimiting a volume tank 9. The electrical switching device 1 includes a nominal contact arrangement 3a, 3b comprising a first nominal contact having a plurality of contact fingers 3a, of which only two are shown here for reasons of clarity. The nominal contact fingers 3a are formed as a finger cage around the longitudinal axis z. The nominal contact arrangement further comprises a second mating nominal contact 3b arranged coaxially about the longitudinal axis z with the nominal contact fingers 3a, and which normally is a metal tube. A shielding 5a can be arranged around the first and the second nominal contact 3a, 3b.

The switching device 1 furthermore comprises an arcing contact arrangement 4a, 4b comprising a first arcing contact 4a and a second arcing contact 4b arranged coaxially about the longitudinal axis z with the first arcing contact 4a. Analogue to the first nominal contact 3a, also the first arcing contact 4a comprises multiple fingers 4a arranged in a finger cage. The second arcing contact 4b is normally rod-shaped.

The contact fingers 3a, 4a are movable relatively to the contacts 3b, 4b from a closed configuration, in which they are in electrical contact to one another, into the opened configuration shown in FIG. 1, in which they are apart from one another, and vice versa.

For the explanatory purposes of the present disclosure, it is assumed that only the first nominal contact 3a and the first arcing contact 4a are movable along the longitudinal axis z and the second nominal contact 3b and the second arcing contact 4b are stationary. However, the disclosure is not limited to this configuration.

The first nominal contact 3a and the first arcing contact 4a are connected to a moving-side current conductor 15. The second nominal contact 3b and the second arcing contact 4b are electrically connected to a stationary-side current conductor 14.

The "closed configuration" as used herein means that the nominal contacts and/or the arcing contacts of the electrical switching device 1 are closed, i.e. are touching one another. Accordingly, the "opened configuration" as used herein means that the nominal contacts and/or the arcing contacts of the electrical switching device 1 are opened, i.e. are separated.

As mentioned, the electrical switching device 1 is shown in FIG. 1 during an opening process in an instant when the distance between the arcing contacts 4a, 4b is still so small that an electric arc 3 is still present between the arcing contacts 4a, 4b. In this disclosure, the volume around the electric arc 3 is called arcing volume 6.

Furthermore, the switching contact 1 comprises a nozzle 6a arranged coaxially about the longitudinal axis z and surrounding the arcing volume 6 in such a way that a contact position of the arcing contacts 4a, 4b is arranged in the nozzle 6a when the switching device 1 is closed.

The first arcing contact 4a is attached to an exhaust tube 7a which is fluidly connected to the arcing volume 6 on an arcing side of the exhaust tube 7a and to a first exhaust volume 7' on an exhaust side of the exhaust tube 7, i.e. on the side of the exhaust tube opposed to the arcing volume 6.

The first exhaust volume 7' is consequently arranged downstream from the arcing volume 6, as viewed in the direction of exhaust gas flowing away from the arcing volume 6, on a first side of the switching device 1 having the first arcing contact 4a. The first exhaust volume 7' is enclosed by a first wall 7b and comprises a first exhaust gas passage 11a, which is for receiving exhaust gas coming from the exhaust tube 7, and a first exhaust opening 12a, which is for exhausting exhaust gas in the tank volume 9 delimited by the enclosure 5.

A second exhaust volume 8' is arranged downstream from the arcing volume 6, as viewed in the direction of exhaust gas flowing away from the arcing volume 6, on a second side of the switching device 1 having the second arcing contact 4b. The second exhaust volume 8' is enclosed by a second wall 8b and comprises a second exhaust gas passage 11b, which is for receiving exhaust gas coming from the arcing region 6. The second exhaust volume 8' has a second exhaust opening 12b fluidly connected to the tank volume 9.

In the present embodiment, the second exhaust volume 8' comprises an intermediate volume 8 enclosed by an intermediate wall 8a, fluidly connected to the second exhaust gas passage 11b and to the second exhaust opening 12b.

The exhaust tube 7, the first exhaust volume 7', the second exhaust volume 8' and the intermediate volume 8 form an exhaust system surrounding the arcing volume 6. The exhaust tube 7a and the first exhaust volume 7' form an exhaust channel 7 connecting fluidly the arcing volume 6 to the first exhaust opening 12a.

The enclosure 5 and the tank volume 9 surround at least partially or, as it is here the case, completely the exhaust system.

The exhaust system further comprises a compression guide 16 extending longitudinally and a piston 18 arranged slideably in the compression guide 16 in a gas-tight manner. The piston is formed at least partially by the first nominal contact 3a. The piston 18 is open on its side facing the arcing volume 6 and delimits together with the compression guide 16 on its side facing the arcing volume 6 a heating chamber 10 fluidly connected to the arcing volume 6. The volume in the compression guide 16 between the piston 18 and the compression guide 16 defines a compression chamber 20. The heating chamber 10 is fluidly connected by way of a separating valve 22 to the compression chamber 20.

In FIG. 1, the second arcing contacts 4b do not mate anymore with the first arcing contact 4a formed at least partially by the exhaust tube 7. Therefore, arc-quenching medium can flow from the heating chamber 10 through the nozzle 6a and through the exhaust tube 7a in direction to the tank volume 9.

In the present embodiment, the exhaust tube 7a extends longitudinally, centered on the longitudinal axis z through a piston bottom wall, to which the exhaust tube 7a is firmly connected in a gas-tight manner. The exhaust tube 7a further extends slideably in a gas-tight manner through a compression chamber bottom wall 70 and opens out into the first exhaust volume 7'.

A plurality of inlet channels 30 in the form of hollow spokes are fluidly connected to the compression chamber 20 and extends from the compression chamber 20 each time to an inlet opening 13 forming a plurality of inlet openings 13 fluidly connected to the tank volume 9. As can be seen in FIG. 1, only one inlet channel 30 and one inlet opening 13 are represented. The inlet channel 30 and the exhaust channel 7 are fluidly separated from each other. In the expansion phase, the arc-quenching medium sucked in through the inlet opening 13 can be refilled from the tank volume 9 to the compression volume 20.

The inlet channel 30 is oriented in a downward direction in a usage position of the electrical switching device 1. This orientation reduces the quantity of arcing dust that can enter and accumulate at an interior wall of the inlet channel 30. Consequently, it further reduces the quantity of arcing dust that can enter in the compression chamber 20 at a later stage.

The usage position of the electrical switching device 1 corresponds to its mounted position for use at a site. In the present case, the usage position corresponds to the longitudinal axis z extending in a horizontal direction and the direction downwards is to be understood as extending in the direction of gravity. In the usage position, the moving-side current conductor 15 and the stationary-side current conductor 14 are arranged on the side of the electrical switching device 1 opposed to the direction of gravity. The inlet opening 13 is arranged after the first exhaust opening 12a, as viewed along the longitudinal axis (z) in the direction opposed to the arcing region 6. This arrangement reduces the exhaust gas flowing from the exhaust system into the inlet channel 30 in a region where the inlet opening 13 adjoins the first exhaust opening 12a.

Concretely, the compression chamber 20 is fluidly connected to the plurality of inlet openings 13 by way of a refill valve 24 and an overpressure valve 26 arranged in the compression chamber bottom wall 70. The refill valve 24 is designed to allow the passage of arc-quenching medium from the tank volume 9 to the compression chamber 20 and the overpressure valve 26 is provided to allow the passage of arc-quenching medium from the compression chamber 20 to the tank volume 9.

The electrical switching device 1 comprises a channeling element 23 adjoining the compression guide 16 on the side facing away to the arcing volume 6, and in which the plurality of inlet openings 13 are formed in such a way that they are free from a fluid connection with the exhaust channel 7. The channeling element 23 is arranged between the compression guide 16 and the exhaust end of the exhaust tube 7a, which extends slideably in a gas-tight manner through the channeling element 23.

Figure 2:
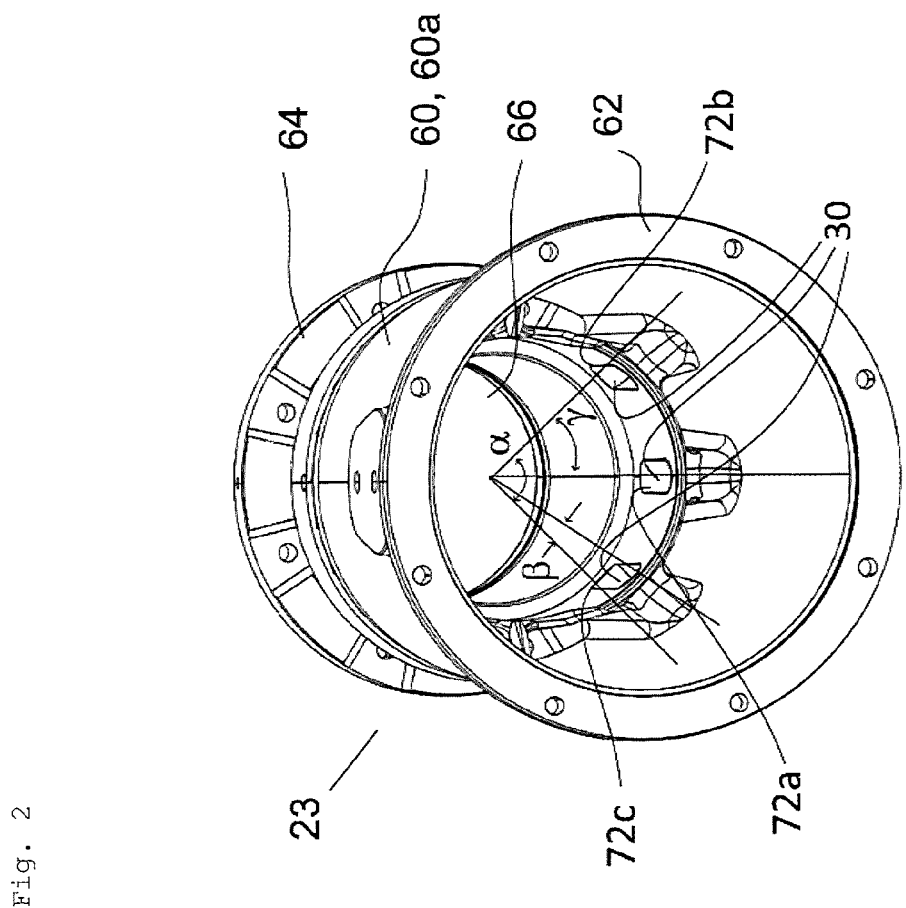
FIG. 2 a perspective front view of an embodiment of the channeling element, represented as viewed along the longitudinal axis of the circuit breaker of FIG. 1.

Referring to FIG. 2, an exemplary embodiment of the channeling element 23 is represented disassembled from the electrical switching device 1 according to the disclosure. The channeling element 23 has substantially a cylindrical symmetry with respect to the longitudinal axis z of the switching device 1. It is formed as a hollow cylindrical conduit 60 delimiting a connecting chamber 66 having a lateral wall 60a.

The channeling element 23 comprises a first flange 62 arranged at the conduit end facing away from the arcing volume 6 for fixing the channeling element 23 to a supporting structure of the electrical switching device 1. In the present embodiment, the supporting structure includes a wall 68 represented in FIG. 1 and forming a separation between the connecting chamber 66 and the exhaust system 2, here concretely the first exhaust volume 7'. It also comprises a second flange 64 arranged at the conduit end facing the arcing volume 6 for fixing the channeling element 23 to the compression guide 16 and allowing a fluid connection of the connecting chamber 66 to the compression chamber 20.

The conduit end facing the arcing volume 6 allows the passage of the exhaust tube 7a and a displacement of the exhaust tube 7a along the longitudinal axis z together with the piston 18. In the mounted state of the channeling element 23, the exhaust tube 7a is free from fluid connection with the connecting chamber 66. In other words, fluids, e.g. exhaust gas, flowing through the exhaust tube 7a cannot flow into the connecting chamber 66.

Further, the conduit end facing the arcing volume 6 is designed to allow the fluid connection of the connecting chamber 66 to the compression chamber 20, as mentioned above. The fluid connection can take place at the refill valve 24 and the overpressure valve 26 provided in the compression chamber bottom wall 70.

An inner side of lateral wall 60a has a plurality of windows 72a, 72b and 72c, from which each time one inlet channel 30 extends radially outwards, forming a plurality of inlet channels 30. Each inlet channel 30 extends through the lateral wall 60a to the corresponding inlet opening 13, forming a plurality of inlet openings 13. The inlet channels 30 are formed as hollow spokes connecting fluidly the inner volume of the channeling element 23 to the tank volume 9 are each projecting from the windows 72a, 72b and 72c radially outwards from the lateral wall 60a.

The embodiment represented in FIG. 2 has three essentially rectangular windows, extending along the longitudinal axis z, arranged symmetrically with respect to a longitudinal symmetry plane extending through a central window 72a of the plurality of windows. The plurality of windows are arranged in an angle sector α (alpha) of approximately 90°, symmetrically with respect to the symmetry plane. As measured in the circumferential direction, the clear opening of each window can range from an angle β (beta) of 5° to 10°. Presently, the windows 72a, 72b and 72c are formed identically to each other and equally spaced from each other by an angle sector γ (gamma) of approximately 45°. The corresponding inlet openings 13 which are not visible in the perspective view of FIG. 2 are distributed and formed in this embodiment with the same geometry at the other end of the respective inlet channels, on an outer side of the lateral wall 60a, i.e. the side of the lateral wall 60a facing towards the tank volume 9.

LIST OF REFERENCE NUMERALS

1 circuit breaker
2 exhaust system
3 electric arc
3a contact fingers of first nominal contact
3b second nominal contact
4a first arcing contact
4b second arcing contact
5 enclosure
5a shielding
6 arcing volume
7' first exhaust volume
7 exhaust channel
7a exhaust tube
7b wall of first exhaust volume
8 second intermediate volume
8' second exhaust volume
8a wall of second intermediate volume
8b wall of second exhaust volume
9 tank volume
10 heating chamber
11a first exhaust gas passage
11b second exhaust gas passage
12a first exhaust opening
12b second exhaust opening
13 inlet opening
14 stationary-side current conductor
15 moving-side current conductor
16 compression guide
18 piston
20 compression chamber
22 separating valve
23 channeling element
24 refill valve
26 overpressure valve
30 inlet channel, spokes
60 cylindrical conduit
60a lateral wall
62 first flange
64 second flange
66 connecting chamber
70 compression chamber bottom wall
72a, 72b and 72c windows in the lateral wall 60a

The invention claimed is:

1. An electrical switching device having a longitudinal axis and delimiting a tank volume, comprising:
    a nominal contact arrangement with a first nominal contact and a mating second nominal contact, which are movable, parallel to the longitudinal axis, in relation to each other and cooperate with each other to switch between a closed state and an open state of the switching device;
    an arcing contact arrangement with a first arcing contact associated with the first nominal contact and a mating second arcing contact associated with the second nominal contact, which are movable, parallel to the longitudinal axis, in relation to each other and cooperate with each other to switch between the closed state and the open state, the first arcing contact and the second arcing contact defining an arcing volume in which an arc is generated during a switch between the closed state and the open state and in which an arc-quenching medium is present;
    an exhaust system surrounding the arcing volume and comprising:
        a first exhaust opening connected fluidly to the tank volume;
        an exhaust channel extending from the arcing volume to the first exhaust opening, the exhaust channel being designed for dissipating hot arc-quenching medium from the arcing volume through the first exhaust opening into the tank volume;
    a compression guide extending along the longitudinal axis;

a piston arranged slideably in the compression guide, the piston delimiting on a side of the piston facing the arcing volume together with the compression guide a heating chamber fluidly connected to the arcing volume, the piston defining on a side of the piston opposed to the arcing volume together with the compression guide a compression chamber fluidly connected to the tank volume; and an inlet channel fluidly connected to the compression chamber and extending to an inlet opening fluidly connected to the tank volume, the inlet channel and the exhaust channel being fluidly separated from each other, the inlet channel being oriented in a downward direction in a usage position of the electrical switching device, and, as viewed along the longitudinal axis in a direction opposed to the arcing region, the inlet opening being arranged after the first exhaust opening.

2. The electrical switching device according to claim 1, wherein the inlet channel extends inclined with respect to the longitudinal axis, radially outwards as viewed in the direction opposed to the arcing region.

3. The electrical switching device according to claim 1, wherein the inlet opening is arranged after the first exhaust opening free from an overlapping region of each other.

4. The electrical switching device according to claim 1, further comprising a plurality of inlet channels.

5. The electrical switching device according to claim 4, wherein the plurality of inlet channels are distributed circumferentially in an axisymmetric manner with respect to the longitudinal axis.

6. The electrical switching device according to claim 4, wherein the plurality of inlet channels are distributed circumferentially with respect to the longitudinal axis, symmetrically with respect to a longitudinal symmetry plane the plurality of inlet channels having a corresponding plurality of inlet openings.

7. The electrical switching device according to claim 6, wherein the plurality of inlet openings are oriented in a downward direction in the usage position of the electrical switching device.

8. The electrical switching device according to claim 6, wherein the plurality of inlet openings are distributed circumferentially with respect to the longitudinal axis, within a circular sector having a central angle α ranging from 5° to 180°, measured in a plane perpendicular to the longitudinal axis.

9. The electrical switching device according to claim 6, wherein the inlet openings are fluidly connected to a refill valve designed to allow passage of arc-quenching medium from the tank volume to the compression chamber and an overpressure valve designed to allow passage of arc-quenching medium from the compression chamber to the tank volume.

10. The electrical switching device according to claim 6, further comprising a channeling element adjoining the compression chamber on a side of the channeling element facing away from the arcing volume, and wherein the inlet openings are formed.

11. The electrical switching device according to claim 6, wherein the longitudinal symmetry plane extends through a central inlet channel of the plurality of inlet channels.

12. The electrical switching device according to claim 6, wherein the plurality of inlet openings are distributed circumferentially with respect to the longitudinal axis, within a circular sector having a central angle α ranging from 60° to 120°, measured in a plane perpendicular to the longitudinal axis.

13. The electrical switching device according to claim 4, wherein the plurality of inlet channels are formed as hollow spikes.

14. The electrical switching device according to claim 1, wherein the arc-quenching medium is a dielectric insulating medium comprising $SF_6$, and/or $CO_2$ and/or organofluorine compound selected from the group consisting of: a fluoroether, a fluoroamine, a fluoroketone, a fluoroolefine, a fluoronitrile, and mixtures and/or decomposition products thereof.

15. The electrical switching device according to claim 14, wherein the organofluorine compound is selected from the group consisting of: perfluoroether, hydrofluoroether, perfluoroamine, perfluoroketone, perfluoroolefine, hydrofluoroolefine, perfluoronitrile, and mixtures thereof.

16. The electrical switching device according to claim 14, wherein the organofluorine compound is a fluoroketone having from 4 to 15 carbon atoms.

17. The electrical switching device according to claim 14, wherein the dielectric insulation medium can further comprise a background gas different from the organofluorine compound and can be selected from the group consisting of: air, $N_2$, $O_2$, $CO_2$, a noble gas, $H_2$; $NO_2$, NO, $N_2O$; fluorocarbons; and mixtures thereof.

18. The electrical switching device according to claim 1, wherein the inlet channel extends inclined with respect to the longitudinal axis, radially outwards as viewed in the direction opposed to the arcing region.

19. The electrical switching device according to claim 1, wherein the inlet opening is arranged after the first exhaust opening free from an overlapping region of each other.

20. An electrical switching device defining a tank volume, the electrical switching device comprising:
  a longitudinal axis;
  a nominal contact arrangement with a first nominal contact and a mating second nominal contact;
  an arcing contact arrangement with a first arcing contact associated with the first nominal contact and a mating second arcing contact associated with the second nominal contact, the first arcing contact and the second arcing contact defining an arcing volume comprising an arc-quenching medium; and
  an exhaust system surrounding the arcing volume and comprising:
    a first exhaust opening connected fluidly to the tank volume;
    an exhaust channel extending from the arcing volume to the first exhaust opening, the exhaust channel being arranged for dissipating hot arc-quenching medium from the arcing volume through the first exhaust opening into the tank volume;
    a compression guide extending along the longitudinal axis;
    a piston arranged slideably in the compression guide;
    a side of the piston facing the arcing volume together with the compression guide defining a heating chamber fluidly connected to the arcing volume,
    a side of the piston opposed to the arcing volume together with the compression guide defining a compression chamber fluidly connected to the tank volume; and
    a plurality of inlet channels, each inlet channel fluidly connected to the compression chamber and extending to an inlet opening fluidly connected to the tank volume, the inlet channel and the exhaust channel being fluidly separated from each other, the inlet channel being oriented in a downward direction in a usage position of the electrical switching device, and, as viewed along the longitudinal axis in a direction opposed to the arcing region, the inlet opening being arranged after the first exhaust opening, wherein the plurality of inlet channels are distributed circumferentially with respect to the longitudinal axis, symmetrically with respect to a longitudinal symmetry plane the plurality of inlet channels having a corresponding plurality of inlet openings, and wherein the inlet openings are fluidly connected to a refill valve designed to allow passage of arc-quenching medium from the tank volume to the compression chamber and an overpressure valve designed to allow passage of arc-quenching medium from the compression chamber to the tank volume.

* * * * *